United States Patent [19]
Patel

[11] Patent Number: 4,818,113
[45] Date of Patent: Apr. 4, 1989

[54] CONTROL FOR BATCH MIXERS

[75] Inventor: Sureshchandra R. Patel, Branford, Conn.

[73] Assignee: Farrel Bridge Limited, Rochdale, United Kingdom

[21] Appl. No.: 42,152

[22] Filed: Apr. 24, 1987

[30] Foreign Application Priority Data

Apr. 26, 1986 [GB] United Kingdom ............... 8610287

[51] Int. Cl.$^4$ ........................ B28C 7/04; B01F 15/00
[52] U.S. Cl. ........................ 366/76; 366/77; 366/79; 366/142
[58] Field of Search ............... 366/76, 77, 79, 83–85, 366/140, 142, 297, 300, 301

[56] References Cited

U.S. PATENT DOCUMENTS

| 3,447,201 | 6/1969 | Seanor | 366/76 |
| 3,921,963 | 11/1975 | Neff et al. | 366/79 X |
| 3,999,046 | 12/1976 | Porter | 366/77 X |
| 4,057,228 | 11/1977 | Völker et al. | 366/79 |
| 4,455,091 | 6/1984 | Bamberger et al. | 366/77 X |

FOREIGN PATENT DOCUMENTS

| 910447 | 3/1982 | U.S.S.R. | 366/142 |
| 1340244 | 12/1973 | United Kingdom . | |
| 2084035 | 7/1984 | United Kingdom . | |
| 2163061 | 2/1988 | United Kingdom . | |

Primary Examiner—Harvey C. Hornsby
Assistant Examiner—Stephen F. Gerrity
Attorney, Agent, or Firm—Parmelee, Bollinger & Bramblett

[57] ABSTRACT

The invention relates to a process for mixing a polymer composition using an internal mixer having rotors 18, 20 rotatably mounted in a chamber 12, a ram 28 by which pressure can be applied to material in the chamber 12, and temperature control for the mixer. Materials are introduced into the chamber 12 and, after introduction of all the materials, at least three mixing variables e.g. temperature, time and energy, indicating mixing quality are monitored and control variables e.g. rotor speed and/or ram pressure adjusted dependent on the monitored mixing variables to achieve previously defined targets or if all are not simultaneously achievable, the most significant target. Control is initiated when the ram has reached a predetermined position and when at least one preselected condition e.g. time, temperature or energy, has been achieved. The mixer comprises a computer 44 effecting the control and arranged to heuristically derive relationships between control and mixing variables by which the process is controlled.

6 Claims, 8 Drawing Sheets

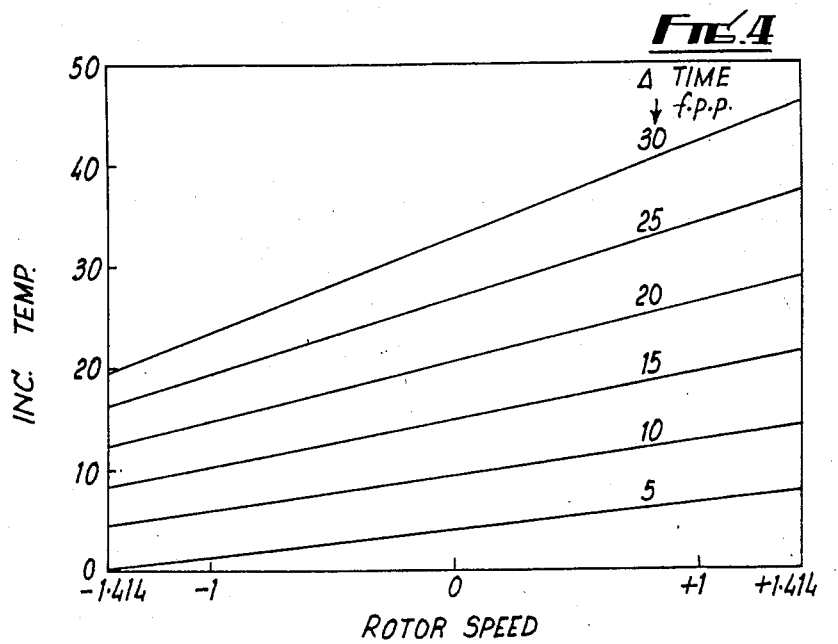
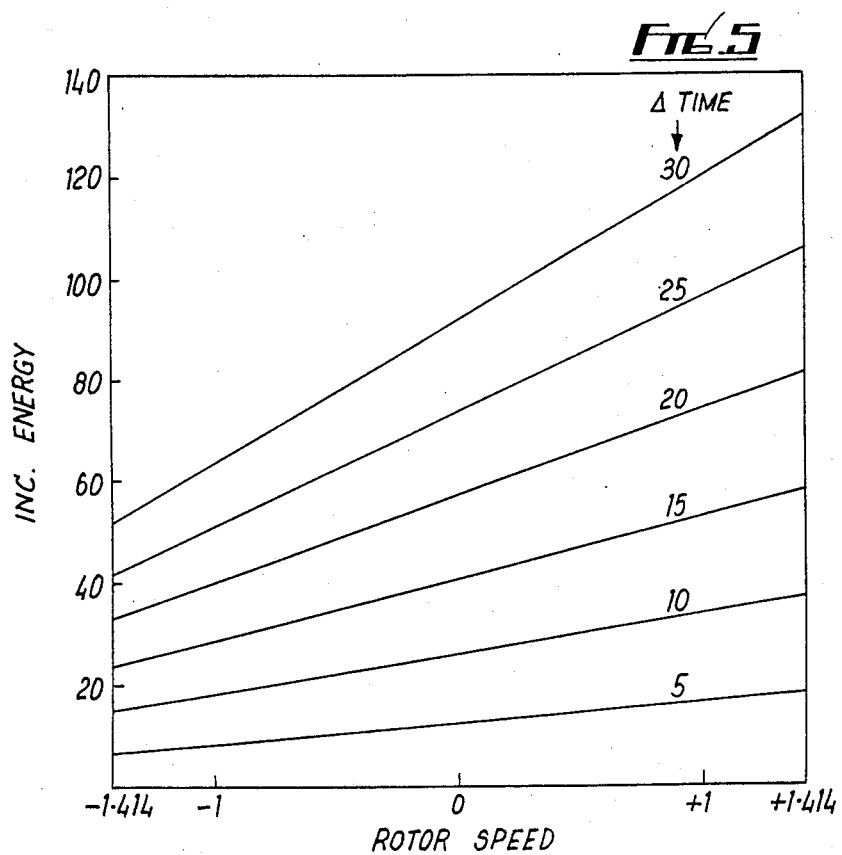

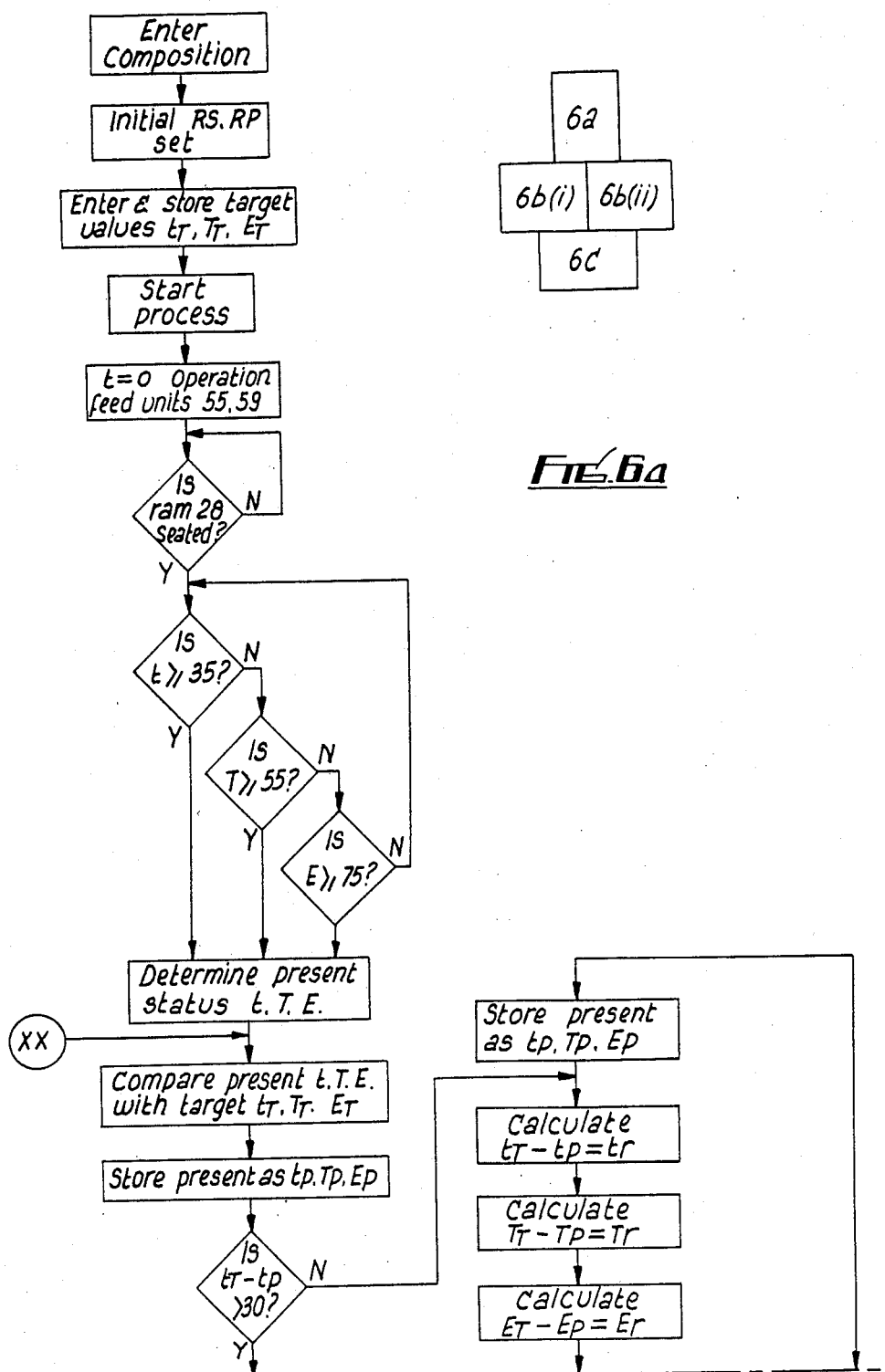

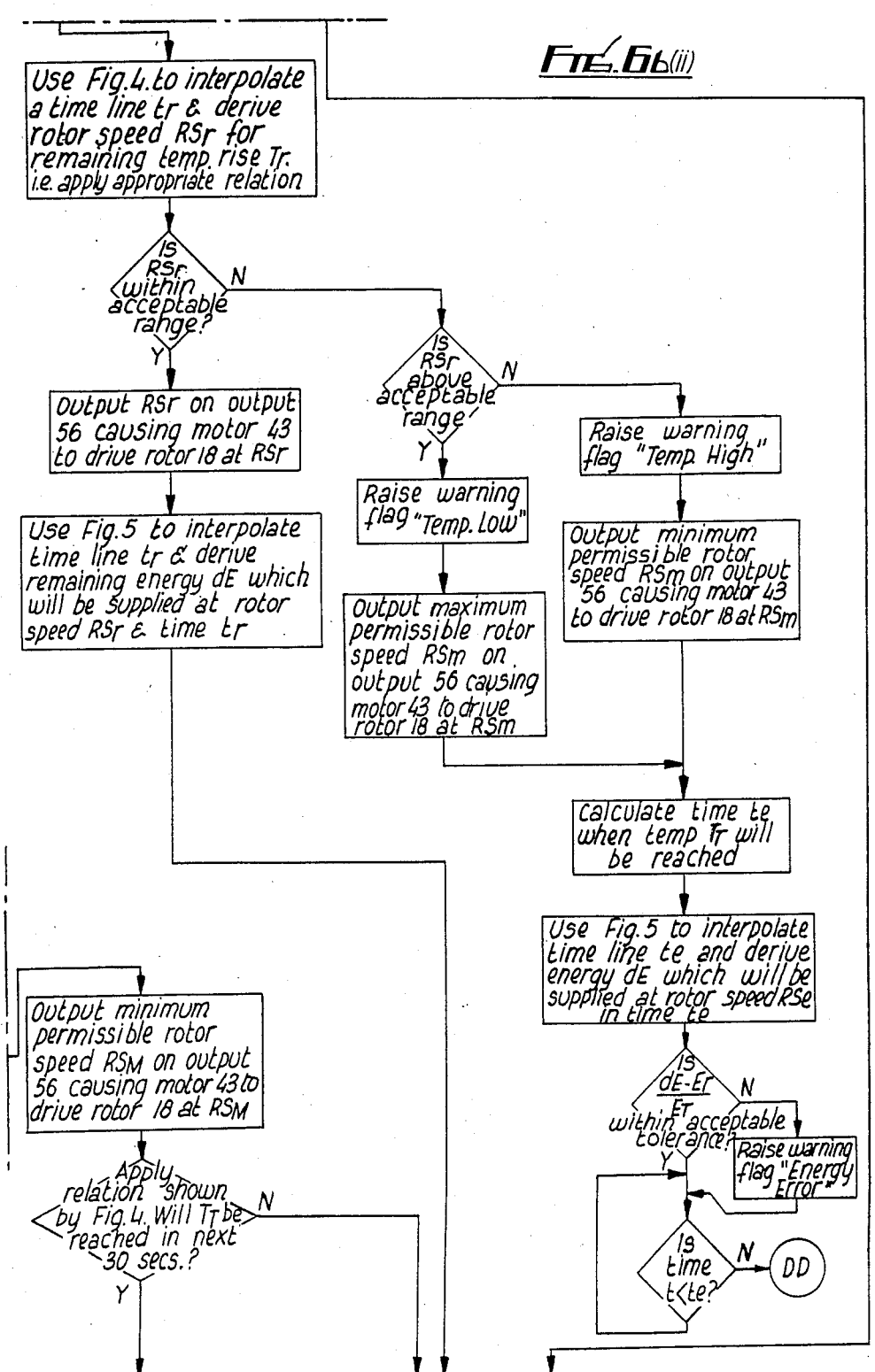
FIG. 6b(ii)

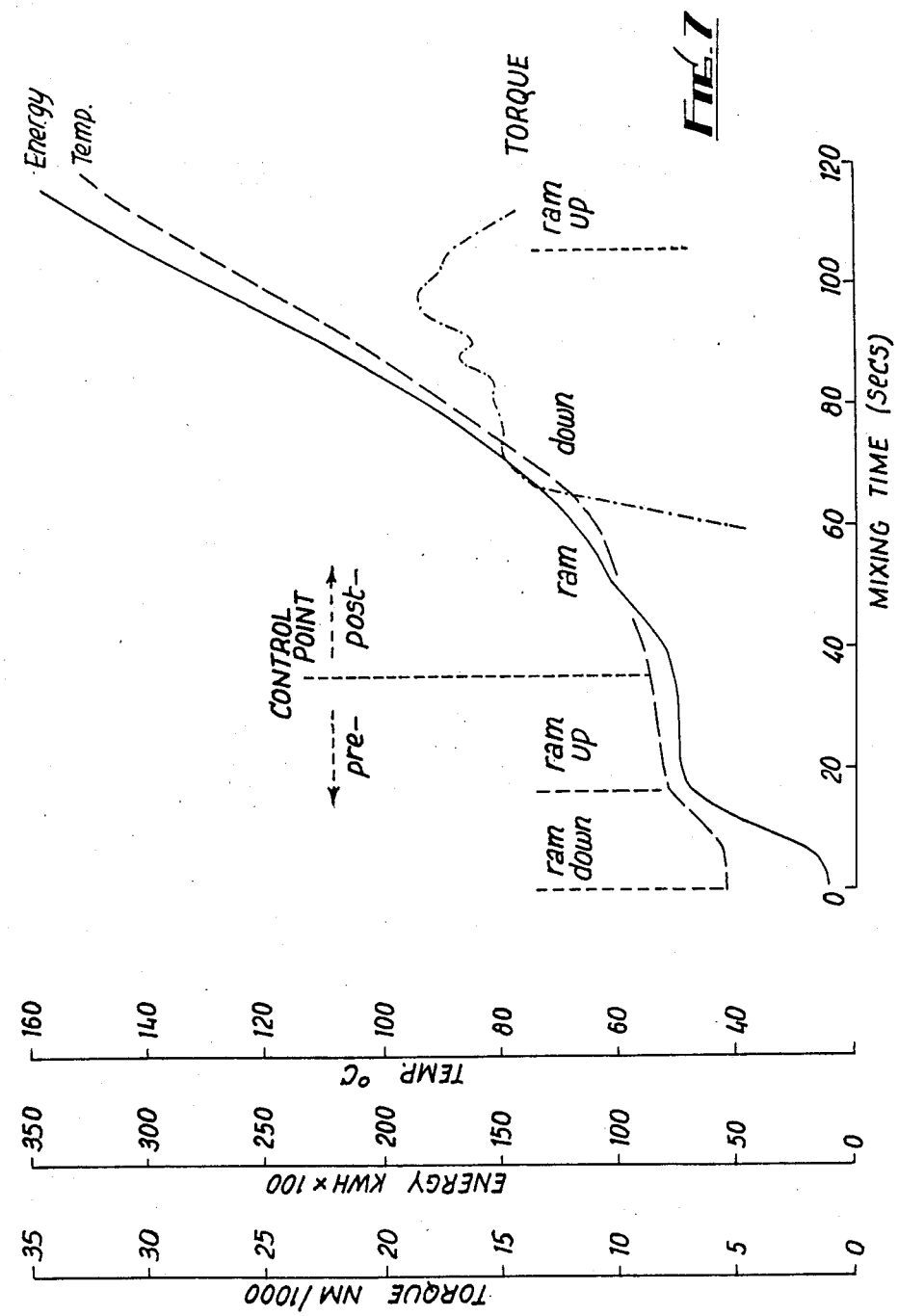

CONTROL FOR BATCH MIXERS

Batch mixers have been commercially available for many years for mixing polymeric materials, for example plastics and rubber materials. Various batch mixers, so-called internal mixers which have performed reasonably satisfactorily have been produced by a number of manufacturers to various different designs. Amongst the successful batch mixers is included the range of batch mixers supplied by the applicant company under the trade name 'Banbury'.

When batch-type mixers were first introduced control of the mixing operation to achieve satisfactory mixing was left almost entirely to the skill of the operator. Poor mixing, especially of rubber materials, can lead to unsatisfactory products produced from the mixed materials or may result in damage or even destruction of the materials being mixed. For example if they are allowed to become too hot degradation of the material may take place. In recent years instrumentation of batch mixers has been improved so that the information available to the operator is increased to aid in control of mixing and some automatic control has been introduced. However, the mixing operation is still dependent to a considerable extent on the operator and control of the mixing operation requires the almost continual attention of an operator.

Various proposals have been made to improve the control of batch mixers, see for example British Pat. No. 2 084 035 which controls the mixing process by monitoring mixing temperature and specific energy, comparing measured temperature and energy supply during the mixing process with a stored ideal curve of values correlating mixing temperature to specific energy consumed and generating a control signal to control the speed of rotation of mixing blades of the mixer and/or the pressure applied by a pressure-operable plunger for closing the mixing chamber of the mixer. British patent application publication No. 2163061 describes a process for mixing polymer until it is estimated to attain a predetermined viscosity by measuring torque (corrected to a reference batch temperature) at a fixed mixer rotor speed, determining the rate of change of torque and predicting the time to reach the predetermined viscosity by extrapolation, thereafter continuing the mixing operation for the predicted time. Such processes have improved control of the mixing operation but it is still not altogether satisfactory.

With improved capabilities of the mixer the various ingredients are added to the mixer in a relatively short space of time which may be insufficient to operate the mixer to compensate for external variable factors, for example ambient factory temperatures (enormous changes can occur between summer and winter), variation of feed stock and quality of materials which, though nominally the same, are supplied by different manufacturers. Many of the previously proposed systems have attempted to control the whole mixing cycle automatically from the beginning; for example, attempts have been made to control precisely the addition of various materials to be mixed to the mixer e.g., in the case of rubber, the addition of carbon black, oil, fillers, curatives, antioxidants etc. The problems in usefully controlling the mixing operation precisely during the initial, feeding stage in which the ingredients are introduced to the mixing chamber are extremely complex and, it appears, not very effective. It has been found that improved control of the results of the mixing process can be usefully achieved by automatically closely controlling only a later stage of the mixing cycle, after all of the ingredients have been introduced to the mixing chamber and initially mixed. By initial mixing we mean a sufficient mixing of the various ingredients to soften and combine them so that they move properly in the chamber. The later stage of mixing, which takes place after the initial mixing phase, carries out work on the materials to be mixed dispersing the ingredients thoroughly throughout the whole mixture and reducing viscosity so that the mixed material is substantially homogeneous at a microscopic level and so that sufficient work has been carried out on the polymer components of the material to ensure that the mixed stock is homogeneous. When processing rubber it is common practice to introduce the raw rubber to the batch mixer in a number of chunks, the carbon black is introduced as a powder and the oils and softeners are generally in liquid form: the initial stage of mixing can be regarded as terminating when the ingredients have been introduced into the mixing chamber, it still being possible to discern with the naked eye identifiable pieces of rubber in the mixing chamber. On the other hand, when the materials have been sufficiently mixed for discharge from the mixer the lumps of rubber will have been thoroughly dispersed and blended with the other ingredients so that the mixed material appears completely homogenous.

One of the various objects of the present invention is to provide an improved mixing process for mixing batches of compositions including polymeric materials e.g. rubbers and plastics.

A process according to the invention for mixing a composition comprising polymeric material is suitably carried out in an internal mixer having two mixing rotors mounted for rotation in a mixing chamber, a ram mounted for sliding movement in a passage opening into the mixing chamber by which pressure can be applied to material in the mixing chamber, and means for controlling the temperature of the mixer.

In one aspect the invention provides a process comprising rotating the rotors at a preselected rate, introducing each of the materials to be mixed into the mixing chamber at appropriate intervals after start of the mixing operation, applying a preselected pressure to the ram and, after all of the materials to be mixed have been added, initiating a control stage when the ram has reached a predetermined position of the ram in the passage and at least one preselected condition has been achieved, the control stage comprising monitored mixing variables from which the quality of mixing can be determined and, dependent on the value of the mixing variables monitored, adjusting control variables of the mixing process so that the mixing process continues towards previously defined ultimate targets of the monitored mixing variables at which mixing is deemed satisfactory.

In another aspect the invention provides a process comprising introducing each of the materials to be mixed into the mixing chamber at appropriate points of the mixing operation and, after introduction of all the materials, initiating a control stage, the control stage comprising monitoring at least three mixing variables from which the quality of mixing can be determined and, dependent on the values of the mixing variables monitored, adjusting the speed of rotation of the rotors and/or the pressure applied by the ram so that the mixing process continues towards previously defined target values of the monitored mixing variables, and terminating mixing when the target values are achieved or, if the target values are not simultaneously achievable, when the most significant target value has been achieved.

In a further aspect the invention provides process comprising mixing a selected number of experimental batches of the composition, during mixing of the experimental batches monitoring at least three mixing variables from which the quality of mixing can be determined, using data assembled from mixing of the experimental batches, deriving a number of relations each relating at least one of the mixing variables with speed of rotation of the rotors and/or pressure applied by the ram, and mixing batches of the composition subsequent to the experimental batches using automatic control in which the mixing variables are monitored and the derived relations are applied to adjust rotor speed and ram pressure to achieve predefined target values of the monitored mixing variables, and terminating mixing when the target values are achieved or, if the target values are not simultaneously achievable, when the most significant target value has been achieved.

In yet another aspect, the invention may provide a process comprising storing a first series of equations relating increase of energy supplied to the materials to be mixed with at least one of rotor speed and ram pressure each equation of the series being valid to predict energy increase over a particular interval of time within a finite period in an automatically controlled state of a mixing cycle subsequent to a material feeding stage, storing a second series of equations relating change in temperature of the material to at least one of rotor speed and ram pressure each equation of the series being valid to predict energy increase over the corresponding increments of time applicable to the first series of equations, deriving from the first and second series of equations first and second relationships relating change in temperature and change in energy input respectively with time, rotor speed and/or ram pressure continuously over a desired operating range, storing desired target values for target energy to be supplied by the rotors to the material in a mixing cycle target temperature to be achieved by the material at the end of the mixing cycle and target length of the mixing cycle, at intervals during the automatically controlled stage comparing energy input with the stored target energy comparing actual material temperature with the stored target temperature comparing time elapsed during the mixing cycle with the target time and calculating the remaining energy to be supplied, the remaining temperature increase and the remaining time necessary to achieve the target values, if the remaining time necessary exceeds said finite period, calculating the finite period as a proportion of the remaining time, calculating the same proportion of the remaining energy to be supplied and remaining temperature increase, applying the equations from the first and second series appropriate to said finite period calulating the rotor speed and/or ram pressure necessary to most closely achieve the calculated proportion of energy to be supplied and temperature at the end of said finite period and causing the rotor speed and/or ram pressure to be adjusted to the calculated values and when the remaining time necessary to achieve the target time is less than said finite period applying the first and second relationships calculating the rotor speed and/or ram pressure necessary to most closely achieve the target energy and target temperature at the the target time and causing the rotor speed and/or ram pressure to be adjusted to the calculated values.

In a further aspect, the invention may provide an internal mixer for mixing a composition comprising polymeric material comprising two mixing rotors mounted for rotation in a mixing chamber, a ram mounted for sliding movement in a passage opening into the mixing chamber by which pressure applied to material in the chamber can be adjusted, means for controlling the temperature of the mixer, means for monitoring the temperature of material in the chamber, means for monitoring the energy supplied to the material by the rotors, means for storing target values of energy supplied, composition temperature and mixing time at which discharge from the mixing chamber of mixed composition is to occur, and control means by which the rotor speed and ram pressure are adjusted in the operation of the mixer, dependent on the monitored energy supplied, composition temperature and time, whereby to achieve the stored target values at discharge or, the stored target values are not simultaneously achievable, to achieve the target value deemed most significant at discharge.

In a process according to the invention mixing variables which might be used to determine when mixing is deemed satisfactory and discharge of material can occur include temperature of the mixed material, total power consumed, time since the start of the mixing cycle, torque applied to the rotors, and total number of revolutions of the rotors since the start of the mixing cycle. The control variables are adjusted during the automatically controlled later stage of the mixing cycle to achieve the preselected targets for the chosen mixing variables, preferably at a selected time: suitable combinations of mixing variables include temperature and power, temperature and torque, temperature and rotor revolutions, rotor revolutions and torque, rotor revolutions and power, and torque and power. The mixing variables which it is preferred to use in a preferred process according to the invention are mixing time, total energy and temperature. The preferred control variables are rotor speed and ram pressure.

It will be appreciated that in most internal, batch mixers, material is supplied to the mixing chamber from a hopper disposed above the mixing chamber, through an inlet passage. During operation of the mixer to mix materials introduced through the mixing passage the passage is closed by a closure member, commonly called a 'ram'. The materials to be mixed are fed through the inlet passage into the mixing chamber and when the materials have been introduced into the mixing chamber, the ram is lowered to prevent material escaping from the mixing chamber through the inlet passage. It will be understood that during the mixing operation considerable pressures arise in the mixing chamber and it is therefore necessary for the ram to be urged downwardly under a certain amount of pressure. Because of the design of the rotors the actual back pressure applied to the ram varies somewhat and the ram may oscillate to some extent; often, however the downward pressure applied to the ram is selected to be so high that the ram is held down in its lowermost position against a mechanical stop, in known processes of mixing. By varying the pressure applied by the ram the mixing characteristics may be varied.

As well as the preferred control variables, other factors can influence a mixing process according to the invention including the temperature of the mixer (normally controlled by a water circulation system) and the 'fill factor' of the mixing chamber—the 'fill factor' is that proportion of the total free volume of the mixing chamber occupied by the material to be mixed. If too high a 'fill factor' is chosen lack of free volume prevents material movement and cross-blending and adequate mixing becomes impossible, likewise if only a very small 'fill factor' is chosen it is difficult to ensure adequate mixing, with high shearing forces, and homogenisation of the material in the mixing chamber. For any particular proposed blend of ingredients, in carrying out a process according to the invention, the 'fill factor' and the coolant temperature are determined by the user of the mixer from experience of such matters.

In carrying out a process according to the invention it is necessary to establish relationships between the various variables. Conveniently, the mixer has a computer control programmed in such a way that by mixing a number of batches of similar materials with the control variables set throughout the later stage of the mixing operation at particular values and the discharge of the material when fully mixed and homogenised occurring when a certain condition has been reached as programmed by the operator, the computer can generate a series of equations relating the mixing variables and control variables, and relating change in mixing variables with elapsed time. In carrying out a process according to the invention relationships derived to effect control are only applicable to one particular fill factor and a particular coolant temperature. The torque level which will have been achieved at discharge may also be predicted.

There now follows a detailed description, to be read with reference to the accompanying drawings, of a process embodying the invention for controlling the batch mixing of materials and an internal mixer suitable for use in carrying out the process. It will be realised that this process and mixer have been selected for description to illustrate the invention by way of example.

In the accompanying drawings:

FIG. 4 is a graph showing the relation of rotor speed and temperature;

FIG. 5 is a graph showing the relation of rotor speed and energy supplied in the illustrative process; FIG. 7 shows graphs of typical experimental results which might be obtained when operating a mixer in a heuristic mode.

Figure 1:
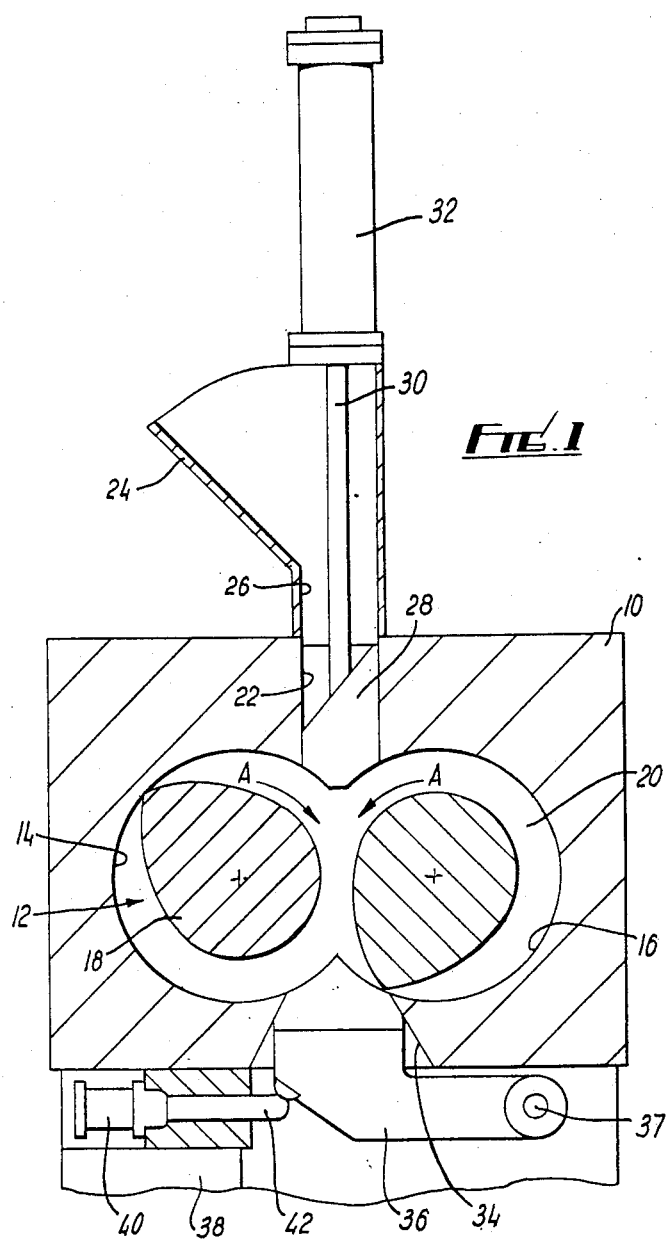
FIG. 1 is a diagrammatic view in section of an internal mixer for use in carrying out a process embodying the invention.

The mixer shown in FIG. 1 of the accompanying drawings is an internal batch-mixer of the type supplied by the applicant company under the trade name Banbury. The mixer comprises a housing 10 in which is formed a mixing chamber 12 of generally Figure '8'-shape cross-section comprising two joined parallel cylindrical portions 14, 16. Two rotors 18, 20 are mounted for rotation about parallel axes which lie in a horizontal plane, the rotor 18 being mounted in the cylindrical portion 14 and the rotor 20 being mounted in the cylindrical portion 16, each with its axis of rotation co-axial with the axis of the respective cylindrical portion. The rotors 18, 20 have any suitable configuration—Banbury mixers have been manufactured with rotors of various different configurations for example as shown in British patent specification No. 1 340 244 and the present invention is applicable to these as well as to other internal, batch mixers having yet further rotor configurations. The rotors 18, 20 used in the example described in detail hereinafter are so-called 'four wing' rotors, supplied by the Applicant company.

The rotors 18, 20 are rotated in opposite directions at slightly different rotational speeds: for example the drive shafts of the rotors 18, 20 may be geared together, the gears on the drive shaft of one rotor 18 intermeshing with the gears on the drive shaft of the rotor 20—suitably the gear on the drive shaft of the rotor 18 may have 29 teeth and the gear on the drive shaft 20 may have only 28 teeth. Thus, the two rotors only reach the same position relative to one another relatively infrequently. The intermeshing gears are suitably driven by an appropriate motor 43 (see FIG. 2) the speed of which can be varied in a known manner to control the speed of rotation of the rotors 18, 20. Each of the rotors 18, 20 sweeps the volume of the associated cylindrical portion 14, 16 of the mixing chamber 12; however, the volumes of the mixing chamber 12 swept by the two rotors 18, 20 do not intersect one another. Whereas the rotors of the mixer used in the example rotate at different speeds, the invention is also applicable where the rotors rotate at the same speed.

The mixer has an inlet opening 22 to the mixing chamber 12, formed in an upper part of the housing 10, centrally disposed between the two cylindrical portions 14, 16. A feed assembly of known construction is arranged to feed material to be mixed through the inlet opening 22 into the mixing chamber 12. The feed assembly comprises a hopper 24, a throat portion 26 of which leads to the inlet opening 22. A closure member, provided by a ram 28 (sometimes referred to in known internal mixers as a 'weight' or a 'plunger') is arranged to close the inlet opening 22 in the operation of the mixer. The ram 28 is mounted at a lower end portion of a piston rod 30 of a piston and cylinder arrangement, the cylinder 32 of which is mounted on an upper portion of the hopper 24 above the inlet opening 22. The ram 28 slides in the opening 22 and throat portion 26 of the hopper 24 and prevents escape of material through the opening 22, during mixing, from the mixing chamber 12. The ram 28 may be raised to an uppermost position by admission of pressurised fluid, normally air, to the cylinder 32; whilst held in this raised position, materials to be mixed may be introduced through the hopper 24 and inlet opening 22 into the mixing chamber 12. Some of the materials to be mixed may be in the form of large pieces of material for example rubber stock and may not merely fall into the mixing chamber but can be pushed into the mixing chamber 12 by the ram 28. When the materials to be mixed have been introduced into the inlet opening 22 the ram is lowered in the illustrative process by admission of air under a controlled pressure to the cylinder 32, the air pressure together with the weight of the ram 28 urging the ram 28 downwardly to push the materials to be mixed into the mixing chamber. When all of the material to be mixed has been fed into the mixing chamber 12, the ram 28 will have reached an operative position in which the ram rests on material to be mixed. As the rotors 18, 20 rotate in the operation of the mixer, material in the mixing chamber 12 will exert considerable upward force on the ram, which is opposed by a downward force provided by the air pressure in the cylinder 32. The pressure imposed by the ram 28 on the material in the mixing chamber (governed by the air pressure in the cylinder 32) has an influence on the mixing and homogenisation of the materials in the mixing chamber. Because of the nature of the design of the rotors 18, 20 the force exerted on the ram 28 by material in the mixing chamber 12 fluctuates considerably. In the process embodying the invention, the ram is caused to descend until it is within a suitable distance of the stop, under a controlled pressure, the ram, when in its operative position, resting on the material to be mixed. In the illustrative process the ram 28 may move up and down to some extent in the inlet opening 22, as mixing takes place. Should the ram pressure cause the ram to reach the mechanical stop the pressure may be relieved sufficiently to allow the ram to 'float'.

The mixer also comprises an outlet opening 34 from the mixing chamber 12 from a lower part of the housing 10, likewise centrally disposed between the two cylindrical portions 14, 16 of the mixing chamber 12. The mixer comprises a closure member, namely a so-called drop door 36 mounted for pivotal movement about an axle 37 journalled in the housing 10. The outlet opening 34 extends substantially along the whole length of the mixing chamber 12. In FIG. 1 the drop door 36 is shown in a closed position in which it is in tight engagement with walls of the outlet opening 34, thereby sealing the outlet opening 34 against escape of material from the mixing chamber 12 during mixing. The drop door 36 is held in its closed position by locking means 38 comprising a cylinder 40 mounted on the housing 10 from which a piston rod 42 projects. The piston rod 42 is urged outwardly of the cylinder to engage a surface of the drop door 36 to urge the door 36 firmly into engagement with walls of the outlet opening 34 thus to seal the opening. When it is wished to open the drop door 36, the piston rod 42 is withdrawn clear of the door and the door can then be pivoted about the axle 37 to move the door completely clear of the outlet opening 34, by moving means (not shown) of known construction. When it is desired to close the door 36, the door 36 is pivoted towards its closed condition by the same moving means. Of course, other means for closing the outlet opening from an internal mixer may be used in a mixer for use in a process embodying the invention.

The mixer also comprises a suitable computer 44 (in the illustrative mixer a Honeywell—IPC 620/30 and a 627–70 mini-computer) by which the illustrative mixer is controlled.

In the operation of the mixer shown in FIG. 1 but without the computer 44 control, material is introduced, through the inlet opening 22 into the mixing chamber 12 with the ram in an uppermost position, and the materials are then forced by the ram 28 into the mixing chamber 12, whilst the rotors 18, 20 are caused to rotate in the direction of the arrows A at a suitable speed (it will be recalled that, because of the gearing between the two rotors 18, 20, the actual speeds of rotation of the two rotors 18, 20 will be very slightly different in the illustrative mixer). The drop door 36 is locked in its closed position (as shown in FIG. 1) during mixing. As material is forced into the mixing chamber by the ram 28, the ram 28 gradually descends under the pressure applied by the cylinder 32 (and its own weight) until it reaches the lowermost position in which it is shown in FIG. 1. The materials to be mixed are not all supplied to the hopper 24 at the start of mixing but, rather, some of the materials are introduced at intervals after start of the mixing operation. When mixing rubber stock it is a usual practice to introduce of the rubber stock at the beginning of the mixing operation and after the initially introduced material has been plasticised sufficiently, to introduce further batches of material which may include, for example, carbon black and oil. In order to introduce further material the rotors 18, 20 continue to be rotated by the motor 43 and the ram 28 is raised by the cylinder 32 so that further material can be supplied through the hopper 24 into the inlet opening 22: the ram 28 is then lowered again. The interval after start of mixing at which the various materials are introduced is determined by the works chemist (or other person knowledgable in the operation of mixing) using his own skill and experience, using various guide lines to indicate when further material should be added, for example the position of the ram 28 in the inlet opening 22, the temperature of the material in the mixing chamber 12, or the amount of work which has been carried out on the material in the mixing chamber 12 since its introduction into the chamber, and who will also, by his experience and skill, judge the appropriate pressure to be applied to the cylinder 32 and an appropriate speed of rotation for the rotors 18, 20. Recently semi-automatic systems have been introduced in which the rotor speed and ram pressure are preset, together with parameters for introduction of various materials, the speed, pressure and parameters being stored in an appropriate memory: a computer control is arranged to indicate when the next material is to be added, and the nature of the material, for example by providing visuals signals e.g. 'add carbon black', 'add oil' etc. The parameters are, however, initially determined, and entered in the memory, by the works chemist or other person knowledgeable in the operation of mixing. Amongst known control systems of this type is included one in which the system monitors temperature of material in the mixer, energy supplied and time, the visual signals to add further material being given when the system determines that any one of the set parameters has been achieved, that is a preset temperature or energy input or time has been achieved.

Some, at least, of the materials to be mixed are usually adversely affected by exposure to too much heat and care must therefore be taken not to work the material too hard, otherwise the temperature of the material may rise unacceptably; on the other hand if the material is not worked adequately it is not possible to introduce the further material within a commercially acceptable time period. It is a common practice to provide some temperature control to the mixer by passing heat exchange fluid through passages (not shown) in the housing 10 and, conveniently, other parts of the mixer. The fluid passed may be heated (especially if the ambient temperature is low) but may also be at ambient temperature or might even be cooled. The heat exchange fluid is usually water and its heating/cooling conveniently controlled by steam/electric heaters and addition of cold water.

After all of the materials have been introduced into the mixing chamber 12 in these known processes the materials will undergo an intensive mixing and homogenisation operation. The rate of rotation of the rotors and the pressure applied by the ram 28 will have been preselected to produce a satisfactory mixing action. Mixing may be deemed to be complete by considering the energy supplied to the material, the temperature of the material or the time for which the material has been subjected to mixing.

In a process embodying the invention, using the mixer described above including the computer 44, a number of batches of a particular composition of material to be mixed are processed and the computer 44 generates a number of series of equations relating control variables (suitably rotor speed and ram pressure) and selected ones of mixing variables (which may include total energy input, temperature of the material in the mixing chamber 12, time of mixing and torque applied to the rotors), at various increments of time throughout a finite period in the later stage of the mixing cycle. After the various equations have been formulated the computer 44 can be used to automatically control the mixing of further batches of the same composition (or closely related compositions) with minimal supervision by the operator.

As discussed above, attempts have been made in the past to control the whole of the mixing operation closely from beginning to end. It has been found that very close control of the cycle after the initial feeding stage, that is in the later stage, can produce acceptable uniformity of mixing and homogenisation from batch to batch of material of substantially identical composition irrespective of considerable variation in external factors, for example ambient temperature, consistency of feed stock and other factors. It has been found that, after all of the materials to be mixed have been added to the composition in the mixing chamber, automatic control of the later stage of the mixing cycle can be initiated when the ram 28 has reached a predetermined position in the inlet opening 22 (a 'ram-seated' position in which the ram 28 rests on the material to be mixed within a predetermined distance of a mechanical stop (not shown) by which descent of the ram 28 into the mixing chamber 12 is prevented) and at least one of certain preselected mixing parameters (energy supplied, temperature, or mixing time) has been reached. The precise time at which the various materials are introduced to the mixing chamber 12 does not appear to have a major influence on the final quality of the mixed composition and the computer 44 may be programmed to introduce materials to the mixing chamber 12 at intervals after the start of the mixing cycle. The system used is that referred to above, the computer being programmed by the user to operate the rotors at a suitable speed and apply a suitable ram pressure during the feeding stage and to cause materials to be introduced when at least one of certain preselected mixing parameters (energy supplied, material temperature and mixing time) has been reached, the computer 44, causing further material to be introduced when the, or a first of the, preselected mixing parameter(s) is reached.

The time from the beginning of the mixing cycle to initiation of the automatic control cycle may vary considerably, depending on the various external factors (as discussed above). In fact, the feeding stage during which materials to be mixed are introduced into the mixing chamber 12 is often so short when using internal, batch mixers of modern design, that it is not possible to realistically split the feeding state into several parts as proposed by some previously proposed control systems, in each part attempting to closely control the mixing operation. No attempt is made to achieve any closed loop control of mixing during the feeding stage of the mixing cycle in the present invention.

Figure 2:
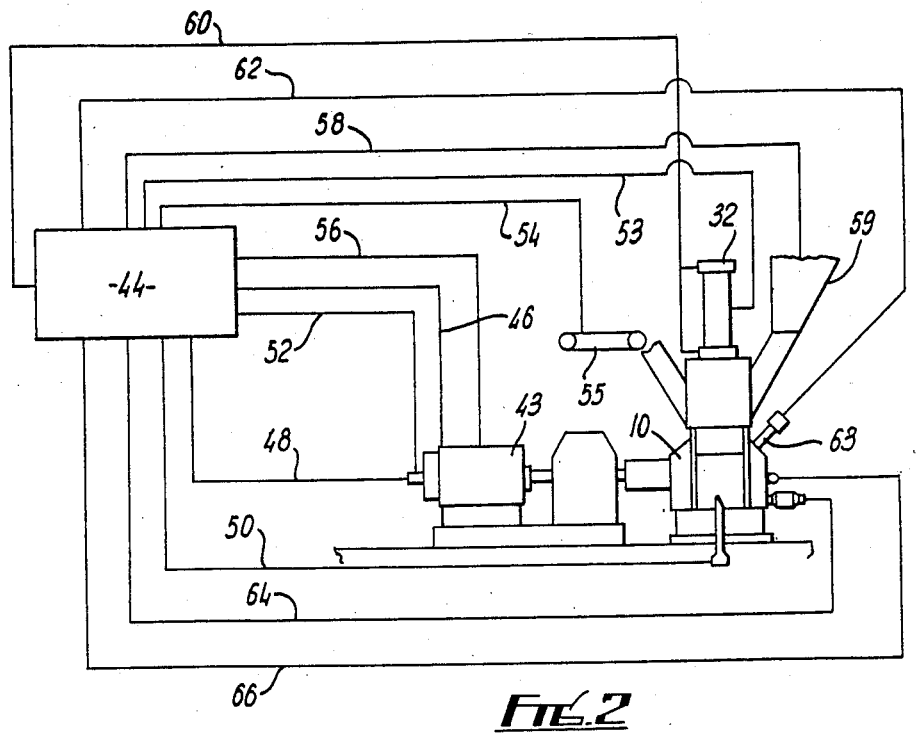
FIG. 2 is a diagram showing control circuitry applied to the mixer shown in FIG. 1 for carrying out a process embodying the invention.

The mixer embodying the invention for carrying out a process embodying the invention is described with reference to FIG. 1 and includes a control system shown diagrammatically in FIG. 2. As hereinbefore mentioned the control system comprises a computer 44 to which is supplied a plurality of inputs. The computer 44 may include an analogue to digital converter by which any analogue inputs are converted to digital form for processing. An input 46 provides an indication to the computer 44 of the torque applied by the rotors 18, 20, derived from the current supplied to the motor 43. An input 48 provides to the computer 44 a count of the number of revolutions carried out by one of the rotors 18, 20. An input 50 provides to the computer a measure of the temperature of the composition in the mixing chamber 12. An input 52 provides the computer 44 with a measure of the rotor speed. An input 53 provides the computer with an indication of the position of the ram 28.

A number of outputs are provided from the computer 44. An output 56 provides control signals to a rotor speed control operative to control the speed of the motor 43, and thus the rotor speed. An output 60 provides control signals to the ram to control the pressure of air admitted to the cylinder 32 thereby to control the pressure applied to the ram 28 and, through the ram, to material in the mixing chamber 12 and to control the ram position in the opening 22. An output 64 provides a door control signal to control means controlling the cylinder 40 and moving means to unlock and open the drop door 36 and allow discharge of material from the mixing chamber 12 when the mixing cycle is deemed completed by the computer 44 and, at the start of a new mixing cycle to close and lock the door 36 prior to introducing material for a fresh batch. Additionally an output 54 provides signals to a solids feed unit 55 by which the solids, for example rubber stock, may be fed to the hopper 22. A further output 58 provides signals to a powder feed unit 59 by which powder, for example carbon black, may be fed to the hopper 22. There is, furthermore, an output 62 which provides signals to an oil injection unit 63 by which oil may be injected into the mixing chamber 12. Finally, an output 66 is provided from the computer 44 by which the temperature of the mixer itself is controlled, by controlling the temperature of water which is circulated through passages in the housing 10 and rotors 18, 20; water is circulated from one or more reservoirs the temperature of which is controlled by introducing cold water (usually water from the factory supply will be sufficiently cold) to reduce the temperature or injecting steam (or heating electrically) to raise the temperature.

In preparing the mixer for carrying out a process embodying the invention it is first necessary to establish a series of equations linking the control variables and chosen mixing variables and relating the change of each chosen mixing variable to time when the control variables are maintained constant, for the particular composition which it is desired to mix. Of course, where the composition is one which has been mixed previously, the various equations will have previously been determined and stored in a memory accessible to the computer 44, for example on a floppy disk, and it will merely be necessary to indicate which composition is to be processed. However, where a new composition is to be processed for the first time it will be necessary for the control system to heuristically derive the equations.

Figure 3:
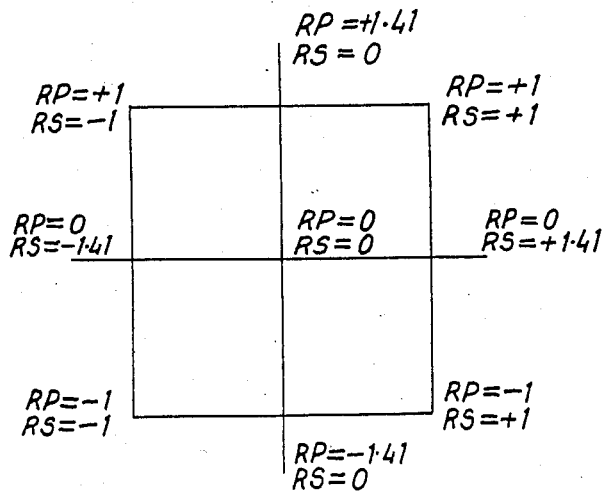
FIG. 3 is a diagram illustrating experimental techniques used in generating the equations referred to above.

The computer 44 of the control system is arranged to determine the various relationships from a series of controlled experiments (14 in all). For polymer processors it has been established that polynomial equations of quadratic form usually give an acceptable fit to experimental results (that is, the higher order terms of the polynomial equation are too small to have any significant effect): this enables an experimental technique referred to as a "central composite rotatable experiment design" to be used. The central composite rotatable design assigns five levels to each variable, namely $-a$, $-1$, $0$, $+1$, and $+a$ where $a=2^{k/4}$ and $k$ is the number of independent variables. In the present case two independent variables (rotor speed and ram pressure) are involved: a schematic diagram of the experimental design is shown in FIG. 3 of the drawings where RP and RS are the independent control variables (RP is ram pressure and RS is rotor speed). One experiment is performed with the control variables set at each of the points indicated apart from a single one of the points, namely the centre point (RP and RS both equal to 0) at which a number of experiments are carried out to obtain an estimate of accuracy achieved. The investigation of the control variables, and their relation to the mixing variables, is carried out over a full range of the control variables which would normally be used in carrying out the process using the particular mixer involved.

The computer 44 is programmed, when in its heuristic mode, to run a number of experiments at the point RP=0, RS=0 to determine the experimental error and also to run an experiment at each of the other points indicated in FIG. 3; thus, the computer is programmed to run 8 experiments, one in respect of each of the points identified in FIG. 3 with the exception of the point RP=0, RS=0 at which six experiments are carried out to determine the accuracy of the equations which will be derived. The order in which the experiments are carried out is randomised to reduce the effect of variables not accounted for e.g. a "first batch" effect. Thus the experiments may conveniently be carried out in the following order:

| BATCH NUMBER | CODED VALUES | |
|---|---|---|
| | ROTOR SPEED | RAM PRESSURE |
| 1 | −1.414 | 0 |
| 2 | 0 | −1.414 |
| 3 | 0 | 0 |
| 4 | 0 | +1.414 |
| 5 | −1 | +1 |
| 6 | +1 | +1 |
| 7 | 0 | 0 |
| 8 | 0 | 0 |
| 9 | 0 | 0 |
| 10 | −1 | −1 |
| 11 | +1 | −1 |
| 12 | +1.414 | 0 |
| 13 | 0 | 0 |
| 14 | 0 | 0 |

The computer is therefore programmed to prompt the operator to carry out the necessary experiments when a new composition is to be processed for the first time. In each experiment of a set the composition of the material will of course be the same, as will the fill factor of the mixer chamber 12 to be mixed and the temperature of the mixer. The mixer will be arranged to add the various ingredients to be added after the beginning of each mixing cycle using the same criteria to judge when to add further material for each batch of material to be mixed: these criteria will be input to the computer 44 by the user on a prompt from the computer 44 before the first of the experiments for a new composition. Determination of experimental data occurs during the whole of each mixing cycle but the data from which the relations between control variables and mixing variables will be established is that arising part way through the mixing cycle from the beginning of the post-feeding, later stage of mixing. The start of this later stage occurs when the ram 28 has reached a seated position (the ram 28 can be deemed to be seated on the stock when, after addition of material, it is within a predefined distance of its lowest possible position in the opening 22) as indicated by a signal on the input 53 and the first to occur of one or more other conditions, (input to the computer, on a prompt from the computer, by the user before the first experimental mixing cycle on a new composition is carried out) has been achieved: these other conditions may be when a predetermined time has elapsed since the start of the mixing cycle or when the stock has reached a predetermined temperature or when a predetermined amount of energy has been supplied to the stock since the start of the mixing cycle. For each mixing cycle the computer 44 will have adjusted the rotor speed and ram pressure to accord with the next one of the experimental points shown in FIG. 3 to be investigated. Prior to operating in the heuristic mode on a new composition, the computer 44 will have prompted the operator to indicate at what discharge criteria the computer 44 is to be regard the composition as being adequately mixed: this may be, for example, when the composition has reached a particular temperature or when a particular amount of energy has been introduced to the composition in the mixer, or at a predetermined time (from beginning of mixing), or, preferably, the first of these to be reached. By maintaining the rotor speed and ram pressure constant at the values appropriate for the particular experimental point under consideration throughout at least the later stage and preferably the whole of each mixing cycle it is possible to establish equations relating ram pressure and rotor speed at various time intervals in the later stage with changes in the mixing variables, for example temperature change and change in energy supplied. The power consumption is determined using the current supplied to the motor 43, as is usual practice. FIG. 7 shows graphs of typical experimental results which might be obtained operating in the heuristic mode.

In order to derive equations relating the rotor speed and ram pressure with changes in mixing variables it is first necessary to establish equations relating changes in each mixing variables with changes in time. In order to achieve this the computer is programmed using an appropriate programme, available commercially from software suppliers for many models of micro and mini computer to carry out an analytical technique known as Polynomial Regression Analysis on the data received. The programmes available are generally able to carry out an analysis using a set of equations to the seventh order. The Polynomial Regression Analysis is carried out using equations having the form:

$$dT = A_0 + A_1 dt + A_2(dt)^2 + \ldots A_n(dt)^n$$
$$dE = B_0 + B_1 dt + B_2(dt)^2 + \ldots B_n(dt)^n$$

Equations (1)

where dT is change in temperature, dE is increase in energy, dt is increase in time and $A_x$ and $B_x$ are the coefficients applicable. In practice it has been decided that, in normal circumstances, an equation of quadratic form is appropriate to calculate temperature change whilst, to calculate energy change, an equation to the fifth power is desirable. Following the establishment of two series each of fourteen equations, each series relating change in one of the mixing variables (temperature or energy) with time at preset rotor speeds amd ram pressures, a further analysis technique known as a Multivariate Regression Analysis is carried out by the computer 44; appropriate programmes are available commercially from software suppliers for many models of micro and mini computer. The Multivariate Regression Analysis technique is a means of determining the constants of a polynomial equation which relate a dependent variable (change in temperature or change in energy) with independent variables (rotor speed and ram pressure, in the present case). As mentioned above, equations of quadratic form generally provide a satisfactory fit for data derived from polymer processing; thus for the experiment design in use, the general form of equations used are:

$$dT = C_0 + C_1 \cdot RS + C_2 + RP +$$
$$C_{11}(RS)^2 + C_{22}(RP)^2 +$$
$$C_{12} \cdot C_{21} \cdot RS \cdot RP$$
$$dE = D_0 + D_1 \cdot RS + D_2 \cdot RP +$$
$$D_{11}(RS)^2 + D_{22}(RP)^2 +$$
$$D_{12} \cdot D_{21} \cdot RS \cdot RP$$

Equations (2)

where dT is temperature increase, dE is energy supplied, RS is rotor speed, RP is ram pressure and $C_x$ and $D_x$ are the various coefficients.

To simplify the calculation it is convenient to attempt to predict temperature or energy changes only over a relatively short finite period of time and at suitable increments of time within this finite period: in polymer processing a suitable finite period may be 30 seconds and, within this finite period, appropriate increments of time may be 5 seconds. The computer 44 is thus programmed to perform the Regression Analysis for every 5 second increment of time from 0 to 30 seconds ahead i.e. for 5, 10, 15, 20, 25 and 30 seconds ahead to derive a first series of equations relating increase in temperature and a second series of equation relating increase of energy supplied, with at least one of rotor speed and ram pressure. Thus, in the first and second series of equations, each equation is valid to predict temperature or energy increase respectively over a particular interval of time (the intervals being spaced by increments of 5 seconds) over a 30 second finite period.

The first and second series of equations thus derived are stored by the computer 44 for use in controlling operation of the mixer in carrying out a process of mixing polymeric material embodying the invention. From these series of equations are derived first and second relationships relating change in temperature and change in energy input respectively, with time and rotor speed and/or ram pressure continuously over the desired operating range, i.e. the finite time period and the available full range of control variables.

As each batch is mixed and discharged, during operation in the heuristic mode, the computer prompts the operator to carry out the next experimental mixing operation, and sets the rotor speed and ram pressure at the appropriate levels. For each mixing cycle in the heuristic mode the computer calculates the Equations (1) which hold for the rotor speed and ram pressure under investigation and stores the equations generated for future use, as outlined above. At the end of the operation in the heuristic mode, involving fourteen mixing cycles i.e. fourteen experiments in all, the computer signals that the heuristic operation is complete and calculates and stores the Equations (2) and thus the mixer is programmed to deal with the particular family of compositions which has been investigated. From then on the mixer is able to carry out a process embodying the invention of mixing the particular family of compositions in question automatically, with little or no intervention from the operator.

In the operation of the mixer in carrying out a process embodying the invention of mixing a composition comprising polymeric material, the materials of the composition are supplied upon suitable signals from the computer 44 on outputs 54, 58, 62 to the hopper 24 at appropriate times following the start of the mixing operation and the ram 28 is raised by the cylinder 32 to allow the materials to fall down the inlet opening 22, the ram 28 then being lowered to force the materials into the mixing chamber. During the feeding stage the action of the mixer is accurately controlled but no attempt is made to employ any complex control until the feeding stage is finished. During the feeding stage of a mixing cycle, the mixer temperature, rotor speed and ram pressure will have been selected (as outlined above) to be appropriate for the feeding stage in question. Polymeric material (and possibly some of the remainder of the composition) will be introduced into the mixing chamber 12 at the start of the mixing cycle and the rest of the material subsequently upon feeding instructions which will have been stored as part of the processing instructions for the composition as entered into the computer 44 by the user (the same feeding instructions as used in the heuristic mode of the mixer). After all materials have been supplied and the feeding stage is thus finished, an interim stage may occur, and then the automatically controlled stage of the mixing cycle starts.

Before commencement of a mixing operation the user will have entered into the computer 44 the target values of the mixing variables which it is wished to achieve at discharge during the mixing operation, namely discharge time (after start of the mixing cycle), discharge temperature of material and total energy supplied during mixing (these targets may differ from the discharge conditions used in the heuristic mode only one of which, it will be recalled, need be achieved).

As mentioned above at the end of the feeding stage as interim stage may occur. Should either the ram not be seated on the material i.e. within a predetermined limit of its lowermost extent of travel, or none of the preprogrammed time, temperature or energy supply criteria have been achieved the mixer will continue in the interim stage until both the ram is seated and at least one of the preprogrammed criteria has been achieved, upon which the automatically controlled later stage of the mixing cycle will commence. Of course should the ram 28 be seated and one of the preprogrammed criteria have been achieved by the end of the feeding stage there will be not interim stage.

On entering the automatically controlled later stage the current status of each of the mixing variables is compared with the target for the appropriate variable, first comparing the time elapsed in the mixing cycle with the target mixing time and calculating the time remaining, if the time remaining exceeds the finite period referred to above, calculating the finite period as a proportion of the remaining time, calculating the same proportion of the temperature increase remaining to achieve the target temperature and applying the appropriate one of Equations (2) to determine what change, it any, will be needed in rotor speed and/or ram pressure to achieve said calculated proportion of the remaining temperature increase at the end of the finite period. One of rotor speed and ram pressure will be maintained constant, if possible, and the other will be adjusted. The applied rotor speed and ram pressure are then used in the other of Equations (2) to predict the energy which will be added during the finite period. If this is within an acceptable tolerance no further adjustment will be made; however, if out of tolerance one of rotor speed and ram pressure (preferably, if possible, the one which was held constant during temperature variation) will be adjusted by the computer to bring the predicted energy input to the required level. The readjusted rotor speed/ram pressure will be then used to recalculate the expected temperature rise during the finite period: if this is outside an acceptable tolerance range further adjustment of one of the control variables will be made to bring the predicted temperature rise to an acceptable figure. No further adjustments will be made until the whole process is re-iterated, starting with comparison of current status with target value for the mixing variables and recalculation of the finite period as a proportion of the remaining time.

If, at any time, the comparison of the time elapsed in the mixing cycle with the target time reveals that the remaining time in the mixing cycle is less than the finite period the first and second relationships are used, for the time period remaining, to calculate the rotor speed and/or ram pressure adjustments necessary to make the temperature change and supply the energy necessary to achieve the target temperature and energy supply at the target time, being re-iterated at the chosen time intervals until the end of the mixing cycle at the target time.

The tolerance acceptable in achievement of target temperature at the end of the mixing cycle is much smaller than that acceptable regarding target energy input and the computer is therefore programmed to give priority to achieving the temperature target. Normally, however, the Equations (2) used will have been derived by operating the mixer in the heuristic mode on the same composition (or a composition which is substantially the same) and so, in normal circumstances, it can be expected that all three of the target values will be achieved at the end of the mixing cycle i.e. target time and, within acceptable tolerances, target temperature and target energy input.

Nevertheless the computer 44 is arranged to apply the process control using a priority system, thus if the computer establishes that it is impossible to achieve all of the target values, it will next attempt to apply the control to reach target values of temperature and energy input at the same time (irrespective of whether the time at which achievement of target temperature and energy input is achieved is close to the target time, although, as close to target time as possible). In normal circumstances at least this should be achievable.

However in some cases (for example inputting of unrealistic target values by the user, operating conditions outside the normal range, or poor quality feed stock), it may prove impossible to achieve either of the above situations: in this case the computer attempts to apply control to achieve target time and temperature or target time and energy. Should this, too, prove impossible to achieve the computer 44 may revert to the existing system in which the mixing cycle is terminated when the first to arise of target time, temperature or energy input occurs or may continue to achieve a preferred one of these, suitably discharge temperature.

If the computer 44 is unable to calculate a satisfactory rotor speed and ram pressure at any part of the automatically controlled stage an alarm signal will be given, indicating that the preselected discharge mixing variables are not attainable, and possibly, the reason why, e.g. unsuitable ingredients added, incorrect weighing out, change in operating conditions.

The rotor speed and ram pressure are thus optimised so that, if possible, both the preselected target discharge temperature and preselected discharge energy input are achieved (within acceptable error limits) at the target time.

In carrying out this process embodying the invention no attempt is made to force the mixing operation along a particular path of, for example, energy input versus material temperature, but only to ensure that the preselected target mixing variables (time, temperature and total energy input) are achieved at the same time—that is at discharge.

It has been found that close automatic control of mixing can reliably achieve desired discharge conditions without undue complexity and expense if close automatic control is not started until after the material feeding stage has terminated: the final mix quality appears to be influenced much more by the final mixing stage than by the occurrences in the feeding stage of the mixing operation.

EXAMPLE

An example of the application of the invention using a particular mixer to mix a particular composition having first operated in the heuristic mode, will now be described. The mixer is a Banbury mixer designated model 'F40' made by the applicant company, having so-called four wing rotors. The maximum rotor speed to be used is 105 RPM and the minimum rotor speed 35 RPM: these speeds correspond, respectively to the points $RS = +1.41$ and $RS = -1.41$ on FIG. 3 of the drawings. From these speeds the intermediate speeds can be calculated to be 45 RPM ($RS = -1$), 70 RPM ($RS = 0$) and 95 RPM ($RS = +1$). Likewise the maximum ram pressure used is 90 PSI (about 621 $kN/m^2$, corresponding to $RP = +1.14$) and the minimum ram pressure is 20 PSI (about 138 $kN/m^2$, corresponding to $RP = -1.414$). From these extreme pressures, the intermediate experimental points can be calculated to be about 30 PSI (about 207 $kN/m^2$, $RP = -1$), 55 PSI (about 379 $kN/m^2$, $RP = 0$), and 80 PSI (about 552 $kN/m^2$, $RP = +1$).

The composition to be processed in carrying out this example comprises:

|  | Parts By Weight |
| --- | --- |
| Styrene-butadiene polymer rubber stock | 51.7 |
| Carbon Black | 34.0 |
| Oil | 13.1 |
| Antioxidant | 1.2 |
|  | 100.00 |

A fill factor of 0.82 was used. The temperature of the circulating water was set at Housing 10, sides 40° C.
Top of Drop Door 36 30° C.
Rotors 18, 20 25° C.

In the feeding stage for each experiment in the heuristic mode in the example, rubber and carbon black were supplied to the mixing chamber at time t=0 and the ram 28 lowered under the particular ram pressure under investigation, with the rotors 18, 20 being rotated at the rate under investigation in the particular experiment. At time t=15 seconds the ram was raised and the oil added. The ram 28 was lowered under the same pressure. The 'later stage' of the mixing cycle was programmed into the computer 44 to start when the ram 28 was seated (that is, in the exampoe, within 20 cm of its lowermost position) and when the temperature T=55° C. This occurred at a time about t=35 seconds.

To analyse the operation of the mixer in the later stage a finite period of 30 seconds was selected as appropriate length and, within this period, increments of 5 seconds were postulated. Polynomial Regression Analysis and Multivariate Regression Analysis of the experimental batches in the heuristic mode resulted in the conclusion that, for the particular composition under investigation the only significant control variables term in equations (2) was the rotor speed (the contributions from the $(RS)^2$ term and from any of the terms involving ram pressure were too small to be significant): of course, this may well not be the case with other compositions. Thus, in the example, the equations which hold are:

$$dT = C_0 + C_1 RS \qquad \text{Equation (3)}$$

$$dE = D_0 + D_1 RS \qquad \text{Equation (4)}$$

and the coefficients $C_0$, $C_1$, $D_0$, $D_1$ in respect of the incremental time values of five seconds are tabulated as Tables 1 and 2, below:

TABLE 1

| Time Interval (seconds) | Coefficients in Equation (3) | |
| --- | --- | --- |
|  | $C_0$ | $C_1$ |
| 5 | 3.954 | 2.4948 |
| 10 | 9.234 | 3.3609 |
| 15 | 14.761 | 4.4754 |
| 20 | 20.533 | 5.8349 |
| 25 | 26.554 | 7.4398 |
| 30 | 32.820 | 9.2909 |

TABLE 2

| Time Interval (seconds) | Coefficients in Equation (4) | |
| --- | --- | --- |
|  | $D_0$ | $D_1$ |
| 5 | 11.9386 | 3.6319 |
| 10 | 25.6743 | 7.4863 |
| 15 | 40.7479 | 12.0584 |
| 20 | 56.8557 | 17.1036 |
| 25 | 73.7736 | 22.5226 |

TABLE 2-continued

| Time Interval (seconds) | Coefficients in Equation (4) | |
| --- | --- | --- |
|  | $D_0$ | $D_1$ |
| 30 | 91.3229 | 28.3325 |

These results can be represented graphically (see FIGS. 4 and 5) by plotting graphs of temperature increase and energy increase respectively against rotor speed for each time interval and the relations represented by these graphs stored by the computer 44.

Figure 6B:
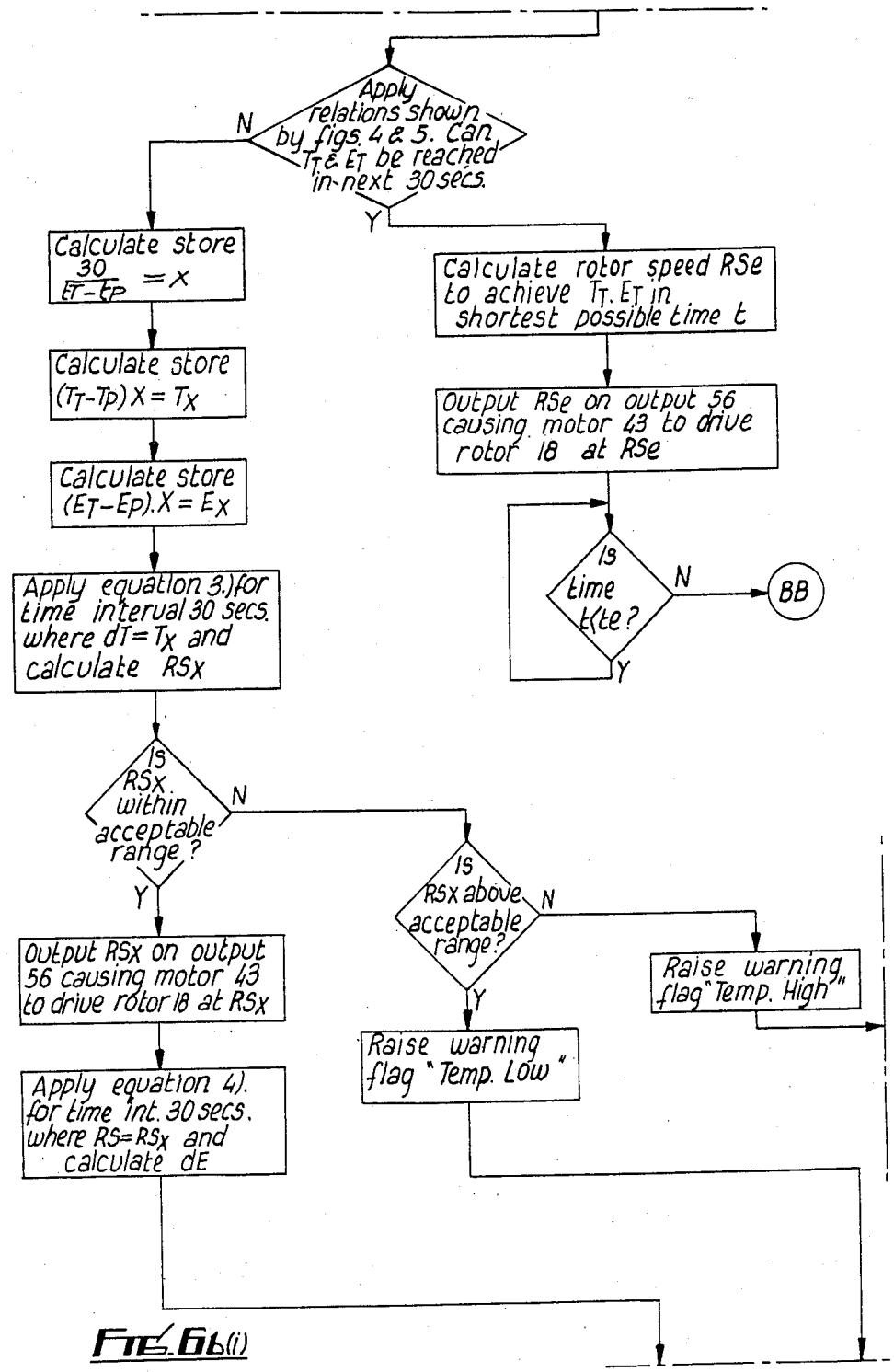
FIGS. 6 a–b–c are a flow chart showing the operation of the computer in controlling the internal mixer and carrying out a process embodying the invention.
Figure 6C:
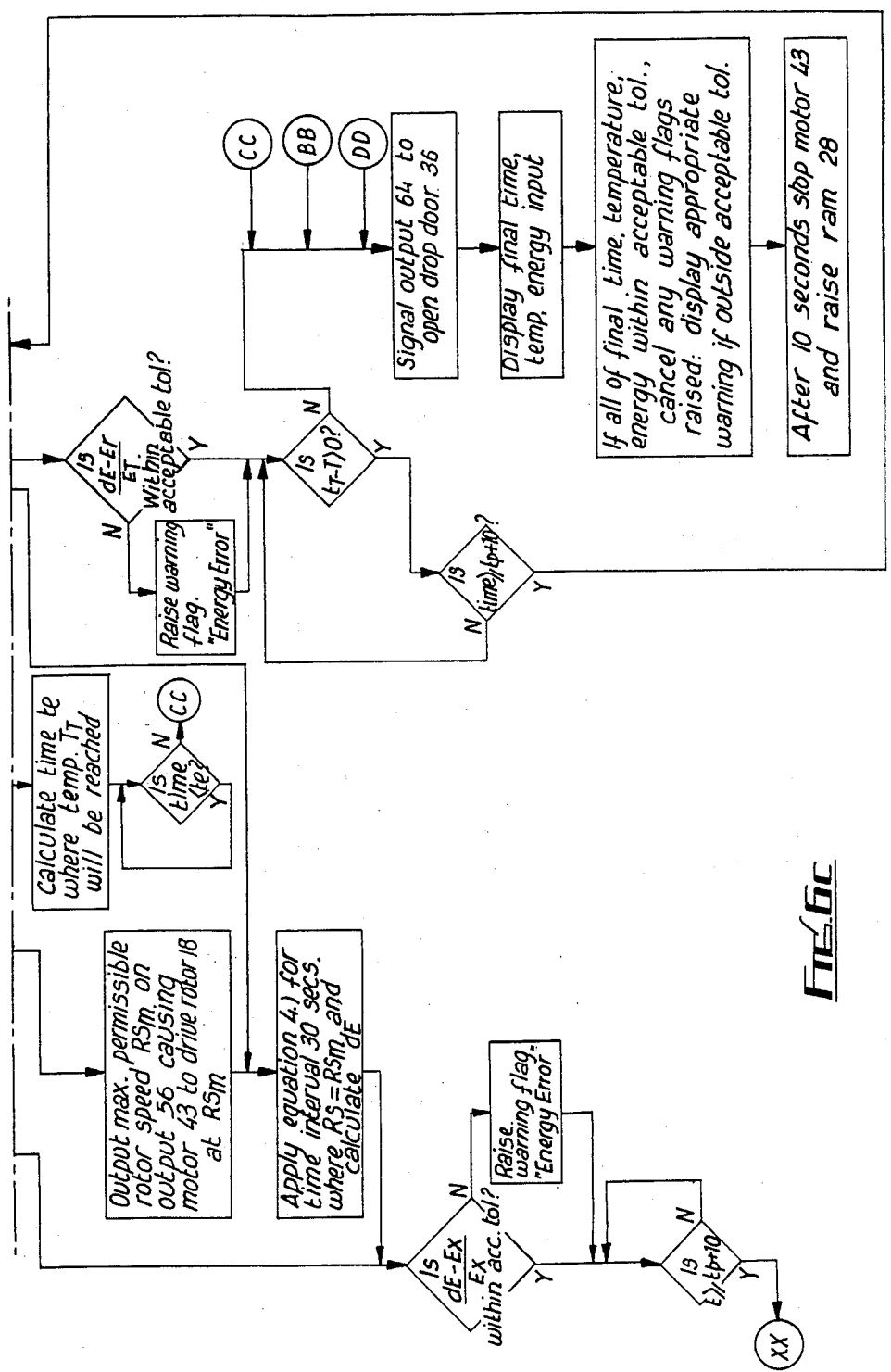

Having stored these relations the mixer is now capable of processing the example composition automatically, as outlined by the flow chart shown in FIG. 6. The operator indicates to the computer which composition is to be processed, conveniently by entering an appropriate identification number, and ensures that the correct ingredients are available to the solids feed unit 55, the powder feed unit 59 and the oil injection unit 63. The operator also enters the desired target values of mixing cycle time ($t_T$), dicharge temperature ($T_T$) and energy input ($E_T$) to the composition, and presses the 'process start' switch. Assuming that the target values are realistic the computer 44 will control the mixing process to achieve the target values as outlined above and shown in the flow chart (FIG. 6). If, at appropriate times in carrying out the process, the computer 44 determines that it is not possible to meet one (or both) of the temperature and energy input targets at the target time, the computer will cause an appropriate warning to be displayed. The operator may then enter new target values of time, temperature and energy input ($t_T$, $T_T$, $E_T$), as the process continues. Alternatively the process may be allowed to continue without any modification of target values, in which case the computer will attempt to achieve the next preferred target (see above) of target energy input and target temperature at the same time (irrespective of the fact that this time is not the target time). Failing the achievement, simultaneously, of target values $T_T$ and $E_T$ the computer 44, in carrying out the illustrative process, is programmed to achieve the temperature target $T_T$, irrespective of energy input.

As an example of the operation of the process suppose that the target values entered are achievable:

1. Present status
   elapsed mixing time t=150 seconds
   stock temperature T=100° C.
   energy input=2.00 kwH
2. Target values
   mixing time $t_T$=205 seconds
   stock temperature $T_T$=135° C.
   energy input $E_T$=3.00 kwH
3. Remaining mix time exceeds 30 seconds
   (205−150)=55 seconds
   finite period=30 seconds
   Temperature increases required in this period $T_x$ $$T_x = (135-100) \times (30/55) = 19° \text{ C.}$$

Energy input required in this period $E_x$ $$E_x = (3.00-2.00) \times (30/55) = 0.54 \text{ kwH}$$

4. From FIG. 4 it can be seen (and the computer 44 can derive from the appropriate stored relation) that the rotor speed $RS_x$ required to achieve a temperature rise of 19° C. at the end of the finite period (30 seconds) is −1.414, that is the minimum rotor speed of 35 R.P.M.

5. From FIG. 5 the energy input at rotor speed $RS_x$ at the end of the finite period can be seen (and the computer can derive this from the appropriate stored relation): in the case of rotor speed −1.414, the energy increase is 0.51, that is an energy insufficiency of about 0.03 kwH, that is about 5% which is within an acceptable tolerance.

6. As shown by FIG. 6 the procedure is reiterated every 10 seconds until the remaining time is less than 30 seconds, when a direct approach to the target value, using the relations shown by FIGS. 4 and 5 is called for.

An object of close process control of the type outlined above is to achieve batch-to-batch consistency in terms of quality of output. A primary measure of mix quality used in the polymer processing industry, especially the rubber industry, is the Mooney viscosity. Currently, Mooney viscosity measurements are made 'off line' (and therefore too late to modify mixing): measuring a rheological property during mixing, so as to estimate a predicted Mooney viscosity of the mix at the end of the mixing cycle, could permit control to achieve desired Mooney viscosity. Torque is a rheological property which can be measured on-line: current drawn by the motor 43 can be used as an indication of torque.

Comparison of torque measured by motor current at discharge with Mooney viscosity measured off-line (under predetermined conditions, including constant temperature), in an experiment involving measurements on fourteen batches as used in the heuristic mode of operation of the illustrative mixer using the composition described above, led to results with no apparent correlation between torque (motor current) and Mooney viscosity (measured off-line) at discharge (see Table 3).

TABLE 3

| BATCH NO. | TORQUE AT DISCHARGE | MOONEY VISCOSITY ML |
|---|---|---|
| 10 | 13939 NM | 44 units |
| 5 | 14440 | 42 |
| 1 | 12460 | 42 |
| 4 | 16552 | 42 |
| 3 | 16130 | 42 |
| 7 | 14704 | 45 |
| 8 | 15576 | 40 |
| 9 | 14916 | 42 |
| 13 | 16024 | 42 |
| 14 | 15681 | 42 |

For consistency only the batches discharged whilst the ram was seated were considered (listed above). Mooney viscosities were measured using samples taken after one pass through a two roll mill after discharge from the mixer and measured at a temperature of 121° C.

The motor current will reflect the state of the mix in the mixing chamber; for example, if stock temperature is raised there is a drop in viscosity and motor current falls, also the more energy which has been supplied to a mix the lower the viscosity and thus the motor current. As other variables in the experiments in the heuristic mode were rotor speed and ram pressure, it would be possible to investigate the influence of these by taking measurements at the same temperature and energy input for all batches. It was found in the experiments that at a temperature of 135° C., the energy supplied was constant to within ±10% (see Table 4).

TABLE 4

| ROTOR SPEED | RAM PRESSURE | ENERGY @ 135° C. | MOTOR CURRENT @ 135° C. |
|---|---|---|---|
| −1 | −1 | 3.00 kwH | 597 amps |
| −1 | +1 | 2.98 | 630 |
| +1 | −1 | 3.02 | 651 |
| +1 | +1 | 2.94 | 723 |
| −1.414 | 0 | 3.01 | 545 |
| +1.414 | 0 | 3.33 | 653 |
| 0 | −1.414 | 2.85 | 606 |
| 0 | +1.414 | 2.86 | 680 |
| 0 | 0 | 3.04 | 658 |
| 0 | 0 | 3.20 | 686 |
| 0 | 0 | 3.18 | 635 |
| 0 | 0 | 3.31 | 613 |
| 0 | 0 | 3.05 | 678 |
| 0 | 0 | 2.81 | 645 |

Using Multivariate Regression Analysis on this data the following equation was established $$\text{Motor Current} = 654 + (37.5 \times RS) + (26.2 \times RP) - (19.6 \times (RS)^2) \quad \text{(Equation 5)}$$

which holds at a stock temperature of 135° C. and energy supplied of 3.04±0.3 KWH.

By carrying out a Multivariate Regression Analysis on motor current, equation (6) was derived, valid in the temperature range 90° to 155° C. and where the ram 28 is within its last 5 cm of travel $$\text{Motor Current} = 903 + (24.06 \times RS) + (20.66 \times RP) - (20.27 \times (RS)^2) - (0.81 \times \text{energy supplied}) \quad \text{Equation (6)}$$

For the mixer (F40 Banbury) used in the example there is a linear relation between motor current and torque. Comparison of motor current/torque predicted using Equation (6) with measured Mooney viscosity at discharge shows reasonable correlation of motor current predictions and torque where rotor speed and ram pressure remain constant. A series of equations may therefore be derived to control the process towards a predicted motor current at a particular rotor speed and ram pressure and thus a desired Mooney viscosity at discharge. Alternatively the motor current being drawn when the end of the mixing cycle (as determined using the control system with target values of time, temperature and energy, described above) is reached can be used to determine whether a desired Mooney viscosity has been reached and, if not, the mixing continued further at the rotor speed and ram pressure prevailing or a newly calculated rotor speed and ram pressure until the desired motor current (and thus Mooney viscosity) is reached.

What is claimed is:

1. A process for mixing a composition comprising polymeric material and additive materials in an internal mixer having two mixing rotors mounted for rotation in a mixing chamber, a ram mounted for sliding movement in a passage opening into the mixing chamber by which pressure can be applied to material in the mixing chamber, and means for controlling the temperature of the mixer, the process comprising:
   (a) rotating the rotors at a preselected rate;
   (b) introducing each of the polymeric and additive materials to be mixed into the mixing chamber at appropriate intervals after start of the mixing operation;
(c) applying a preselected pressure to the ram; and
(d) after all of the materials to be mixed have been added, initiating a control stage when the ram has reached a predetermined position of the ram in the passage, the control stage comprising:
(1) selecting defined ultimate targets from at least some monitorable mixing variables at which mixing is deemed satisfactory, said mixing variables being selected from composition temperature, total energy input to the composition by the rotors during mixing, mixing cycle time, torque of the rotors at a preselected mixing cycle time and position of the ram;
(2) monitoring said mixing variables from which the quality of mixing can be determined; and
(3) dependent on the value of the mixing variables monitored, adjusting at least one control variable of the mixing process selected from rotor speed and ram pressure so that the mixing process continues towards the previously defined ultimate targets of the monitored mixing variables at which mixing is deemed satisfactory.

2. A process for mixing a composition comprising polymeric material and additive materials in an internal mixer having two mixing rotors mounted for rotation in a mixing chamber, a ram mounted for sliding movement in a passage opening into the mixing chamber by which pressure can be applied to material in the mixing chamber and means for controlling the temperature of the mixer, the process comprising:
(a) introducing each of the polymeric and additive materials to be mixed into the mixing chamber at appropriate points of the mixing operation; and
(b) after introduction of all the materials, initiating a control stage, the control stage comprising:
(1) selecting defined ultimate targets from at least some monitorable mixing variables at which mixing is deemed satisfactory, said mixing variables being selected from composition temperature, total energy input to the composition by the rotors during mixing, mixing cycle time, torque of the rotors at a preselected mixing cycle time and position of the ram;
(2) monitoring at least three mixing variables from which the quality of mixing can be determined; and
(3) dependent on the values of the mixing variables monitored, adjusting at least one of the speed of rotation of the rotors and the pressure applied by the ram so that the mixing process continues towards the previously defined target values of the monitored mixing variables, and
(4) terminating mixing when the defined target value of the torque of the rotor at a preselected mixing cycle time is achieved, with the proviso that if the defined target value of the torque is not achievable, then terminating mixing when the most significant defined set of target values selected from mixing cycle time and composition temperature or mixing cycle time and total energy input to the composition by the rotors has been achieved.

3. A process for mixing a composition comprising polymeric material and additive materials in an internal mixer having two mixing rotors mounted for rotation in a mixing chamber, a ram mounted for sliding movement in a passage opening into the mixing chamber by which pressure can be applied to material in the mixing chamber and means for controlling the temperature of the mixer, the process comprising:
(a) mixing a selected number of experimental batches of the composition;
(b) during mixing of the experimental batches monitoring and storing data for at least three mixing variables from which the quality of mixing can be determined;
(c) using the data stored from mixing of the experimental batches and deriving a number of equations, each equation relating at least one of the mixing variables with at least one of the speed of rotation of the rotors and the pressure applied by the ram; and
(d) mixing a batch of the composition subsequent to the experimental batches using automatic control comprising:
(1) selecting defined ultimate targets from at least some monitorable mixing variables at which mixing is deemed satisfactory, said mixing variables being selected from composition temperature, total energy input to the composition by the rotors during mixing, mixing cycle time, torque of the rotors at a preselected mixing cycle time and position of the ram;
(2) monitoring the mixing variables of the subsequent batch and applying the derived relations to adjust at least one of rotor speed and ram pressure to achieve the predefined target values of the monitored mixing variables, and terminating mixing when the predefined target values are achieved, with the proviso that if all the target values are not simultaneously achievable, then terminating mixing when the most significant predefined target values have been achieved.

4. A process according to claim 3, wherein the mixing variables of the experimental batches are selected from composition temperature, total energy supplied to the composition by the rotors during mixing, mixing cycle time and torque of the rotors at a preselected mixing cycle time and position of the ram.

5. A process according to claim 4 wherein the mixing variables of the batch subsequent to the experimental batches are composition temperature, total energy supplied to the composition by the rotor during mixing and mixing cycle time.

6. A process for mixing a composition comprising polymeric material and additive materials in an internal mixer having two mixing rotors mounted for rotation in a mixing chamber, a ram mounted for sliding movement in a passage opening into the mixing chamber by which pressure applied to material in the chamber can be adjusted and means for controlling the temperature of the mixer, the process comprising:
(a) storing a first series of equations relating increase of total energy supplied to the composition to be mixed with at least one of rotor speed and ram pressure, each equation of the series being valid to predict energy input increase over a particular interval of time within a finite period in an automatically controlled stage of a mixing cycle subsequent to a material feeding stage,
(b) storing a second series of equations relating change in temperature of the composition to at least one of rotor speed and ram pressure, each equation of the series being valid to predict temperature increase over the corresponding increments of time applicable to the first series of equations;
(c) deriving from the first and second series of equations first and second relationships relating change in total energy input supplied to the composition and change in temperature of the composition, respectively, with at least one of mixing cycle time, rotor speed and ram pressure continuously over a desired operating range of mixing time;
(d) storing desired target values for target total energy to be supplied by the rotors to the composition in a mixing cycle, target composition temperature to be achieved by the composition at the end of the mixing cycle and target length of time of the mixing cycle;
(e) at intervals during the automatically controlled stage:
  (1) comparing total energy input to the composition with the stored target total energy input to the composition;
  (2) comparing actual composition temperature with the stored target composition temperature;
  (3) comparing the time elapsed during the mixing cycle with the target length of time of the mixing cycle; and
  (4) calculating a remaining total energy to be supplied to the composition, a remaining temperature increase of the composition and a remaining time of the mixing cycle necessary to achieve the respective target values;
(f) if the remaining time of the mixing cycle necessary exceeds said finite period:
  (5) calculating the finite period as a proportion of the remaining mixing cycle time;
  (6) calculating the same proportion of a remaining total energy input to be supplied;
  (7) calculating the same proportion of a remaining composition temperature increase to be achieved;
  (8) applying the equations from the first and second series appropriate to said finite period and calculating an adjustment in at least one of rotor speed and ram pressure necessary to most closely achieve the calculated proportion of total energy increase to be supplied and the calculated proportion of composition temperature increase at the end of said finite period; and
  (9) causing at least one of rotor speed and ram pressure to be adjusted to the calculated rotor speed and ram pressure adjustment; and
(g) when the remaining time necessary to achieve the target mixing cycle time is less than said finite period
  (10) applying the first and second relationships calculating the rotor speed and ram pressure adjustment values necessary to most closely achieve the target total energy input to the composition and target composition temperature at the target mixing cycle time, and
  (11) causing at least one of the rotor speed and ram pressure to be adjusted to the calculated rotor speed and ram pressure adjustment values.

* * * * *